US010612959B2

(12) United States Patent
Kn

(10) Patent No.: US 10,612,959 B2
(45) Date of Patent: Apr. 7, 2020

(54) SPLIT ELECTRONIC VOLUME CORRECTOR (EVC)

(71) Applicant: Honeywell International Inc., Morris Plains, NJ (US)

(72) Inventor: Dinesh Kumar Kn, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 393 days.

(21) Appl. No.: 15/248,646

(22) Filed: Aug. 26, 2016

(65) Prior Publication Data

US 2018/0058907 A1 Mar. 1, 2018

(51) Int. Cl.
*G01F 25/00* (2006.01)
*G01F 15/02* (2006.01)
*G01F 15/06* (2006.01)

(52) U.S. Cl.
CPC ........ *G01F 25/0007* (2013.01); *G01F 15/022* (2013.01); *G01F 15/063* (2013.01)

(58) Field of Classification Search
CPC .................................................. G01F 25/0007
USPC ........................................................ 73/1.16
See application file for complete search history.

(56) References Cited

U.S. PATENT DOCUMENTS

| 2007/0213949 | A1 | 9/2007 | Artiuch | |
| 2009/0187356 | A1* | 7/2009 | Artiuch | G01F 25/0053 702/45 |
| 2011/0248857 | A1* | 10/2011 | Rutherford | G08B 21/16 340/632 |
| 2014/0343734 | A1* | 11/2014 | Meyer | G05B 15/02 700/282 |
| 2015/0276433 | A1 | 10/2015 | Brahmajosyula et al. | |

FOREIGN PATENT DOCUMENTS

| EP | 0309644 A2 | 4/1989 |
| KR | 100963429 B1 | 6/2010 |
| KR | 20110022877 A | 3/2011 |
| WO | 2007037616 A1 | 4/2007 |

* cited by examiner

*Primary Examiner* — Walter L Lindsay, Jr.
*Assistant Examiner* — Philipmarcus T Fadul

(57) ABSTRACT

An Electronic Volume Corrector (EVC) for measuring a flow of a gas in a gas line includes a plurality of EVC sensor interface units for collecting a plurality of sensed sensor parameters including uncorrected gas volume data (UGVD) from a gas meter, a gas pressure from a gas pressure sensor and gas temperature from a gas temperature sensor. An EVC processing unit is communicably connected to the EVC sensor interface units for performing volume correction for generating corrected GVD (CGVD) from the UGVD received from each of the EVC sensor interface units, data logging, and networking functions. The EVC sensor interface units and the EVC processing unit are configured independent including being physically separate from one another.

13 Claims, 2 Drawing Sheets

US 10,612,959 B2

SPLIT ELECTRONIC VOLUME CORRECTOR (EVC)

FIELD

Disclosed embodiments relate to electronic volume correctors.

BACKGROUND

Fluids, such as natural gas, are transported, distributed, and sold to end-users (e.g., consumers) through a distribution system. For example, a furnace in an industrial plant may receive natural gas through a gas line. The gas consumption rate by the end user is known to vary over time.

A gas meter is generally installed on the gas line to measure the amount of gas consumed by the user. One type of gas meter is a rotary (mechanical) gas meter. Gas is typically sold by price per volume and is billed in price (e.g., $)/unit volume at base reference conditions of pressure and temperature as per applicable standards. Proper gas billing, as well as other functions, depends on accurate gas metering. Such conventional gas meters which measure the volume of flowing gas by mechanical means require correction because they do not take into account the effect of pressure (P), temperature (T) and super compressibility (Z) on the volume so that the measured volume lacks accuracy. P, T and Z corrections are applicable even for non-mechanical flow meters such as ultrasonic flow meters.

Gas meters are generally communicably coupled to a gas data downloading device for downloading consumption and gas meter readings generally being uncorrected gas volume data (UGVD), and the state variables (P, T) received from the gas meters. In the case of EVCs, each gas meter will be coupled to an EVC, and a separate dedicated EVC is generally provided at each service location to service a plurality of gas meters.

Most gas meters whether electronic or mechanical provide a pulsed output having a pulse count that corresponds to a particular UGVD generally referred to as an "uncorrected volume". The gas density is recognized to change as a function P and T (as well as for composition changes for gas mixtures such as natural gas), and variations in these variables can result in differences in energy content for like volumes of gas. Hence the UGVD is generally compensated for P, T (and if applicable and available the composition) variations and is represented as CGVD at standard conditions of P and T. The output data from the primary gas meter is also referred to as "interval data". Some gas meters have a local memory which enables the capability to provide accumulated gas meter readings for a particular interval of time, such as corresponding to a day, week or a month.

The EVC generally performs the P and T (and optionally for composition) correction to generate CGVD from the UGVD received from the gas meters or directly from gas pipe. The EVC has a local memory that enables the capability to store gas meter data for a particular duration, accumulated gas meter data (UGVD and CGVD) from a start and end time along with time stamps (typically time of use, ToU), and the EVC generates alarms in case of a detected error condition. Each EVC in the system will generally have a serial number (S/N) to enable a unique identification by the associated Meter Data Management (MDM) system.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize known EVCs have numerous problems. For example, such EVCs lack resources as most EVCs are battery powered and thus must run at low processing power and have a small memory. Also the ON time of EVCs are controlled to maximize battery life. Adding advanced software features such as the latest communication/networking schemes, and an advanced human machine interface (HMI) are not possible with known EVC system architectures. Moreover, added software will demand more hardware and the EVC will become more complex making it difficult to pass required certification.

Disclosed EVCs solve the above problems by providing a distributed hardware (split) EVC, where the EVC is split to 2 different physical subsystems, an EVC sensor interface unit and an EVC processing unit. The split EVC includes a plurality of EVC sensor interface units each for collecting a plurality of sensed sensor parameters including uncorrected gas volume data (UGVD) from a gas meter, a gas pressure from a gas pressure sensor, and gas temperature from a gas temperature sensor. An EVC processing unit is communicably connected to the plurality of EVC sensor interface units for performing volume correction for generating corrected GVD (CGVD) from the UGVD received from the plurality of EVC sensor interface units, data logging, and networking functions. The EVC sensor interface units and the EVC processing unit are configured independent including being physically separate from one another.

DETAILED DESCRIPTION

Figure 1:
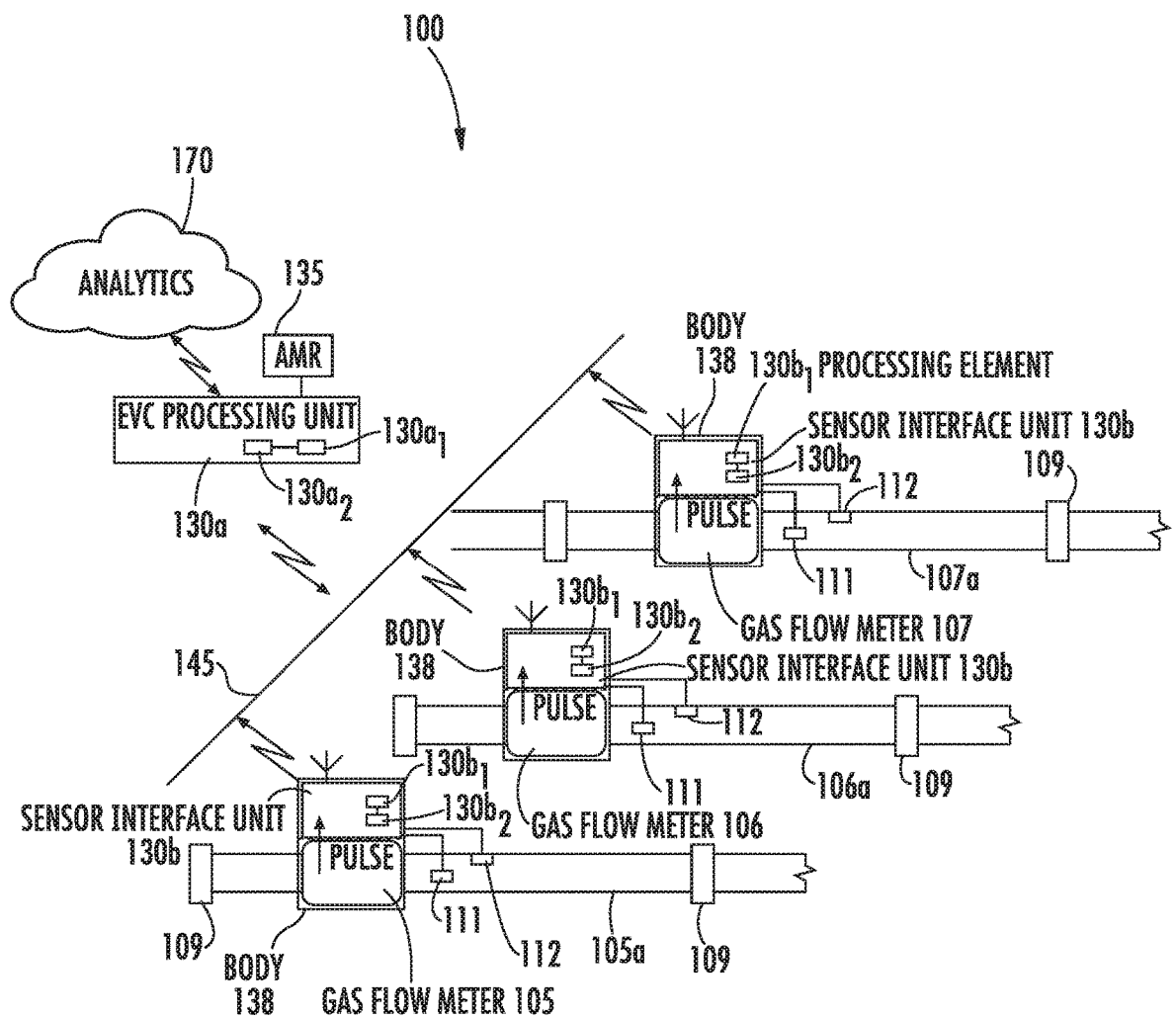
FIG. 1 shows a portion of a gas metering and telemetry system including an example split EVC having a plurality of sensor interface units in a hazardous zone and an EVC processing unit installed in a safe zone communicably coupled to the sensor interface units by an example wireless link, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

The sensor interface units and EVC processing units of disclosed split EVCs are self-sufficient, physically separate and separately configurable units. For example, the sensor interface units can be configured according to the type of gas flow meters (mechanical or ultrasonic), periodicity at which it should push sensor data to the EVC processing unit, and alarm limits of its battery that it generally has which can be specific to the particular gas meter and metering needs. The EVC processing unit is generally configured with a different set of data, such as the EVC sensor interface unit IDs which are associated with the EVC processing unit, and network interface related configuration data. However, an operator can generally push all this configuration data in one configuration activity to go to the EVC processing unit as well as its associated EVC sensor interface units from locally or from a remote location.

The EVC sensor interface units can be physically installed in a hazardous location (Hazloc). Hazlocks are defined as places where fire or explosion hazards may exist due to the presence of flammable gases, flammable liquid-produced vapors, combustible liquid-produced vapors, combustible dusts, or ignitable fibers/flyings present in the air in quantities sufficient to produce explosive or ignitable mixtures. Electrical equipment installed in such locations should be specially designed and tested to ensure it does not initiate an explosion, due to arcing contacts or high surface temperature of equipment. One may need to have ATEX/IEC Ex/CSA certification and approvals to install an EVC in Hazloc. Hazolc is classified to zones (z2, z1, z0-z0 is most severe) and class and divisions in the US.

FIG. 1 shows a portion shows a gas metering system 100 including an example split EVC 130$a$, 130$b$ having a plurality of sensor interface units 130$b$ in a hazardous zone and an EVC processing unit 130$a$ installed in a safe zone, according to an example embodiment. The plurality of sensor interface units 130$b$ are communicably coupled to the EVC processing unit 130$a$ by a wireless link 145. However, wired communication links are also possible. The sensor interface units 130$b$ are installed for collection of a plurality of sensed sensor parameters including a gas flow in a gas line from a gas flow meter (gas meter) 105, 106, 107 installed on respective pipe sections 105$a$, 106$a$, 107$a$ with flanges 109 on the ends of the pipe section for connecting in the pipe section to a pipeline to enable its gas volume to be measured. The sensor interface units 130$b$'s are each shown including a processing unit 130$b_1$ and a memory 130$b_2$.

Figure 2:
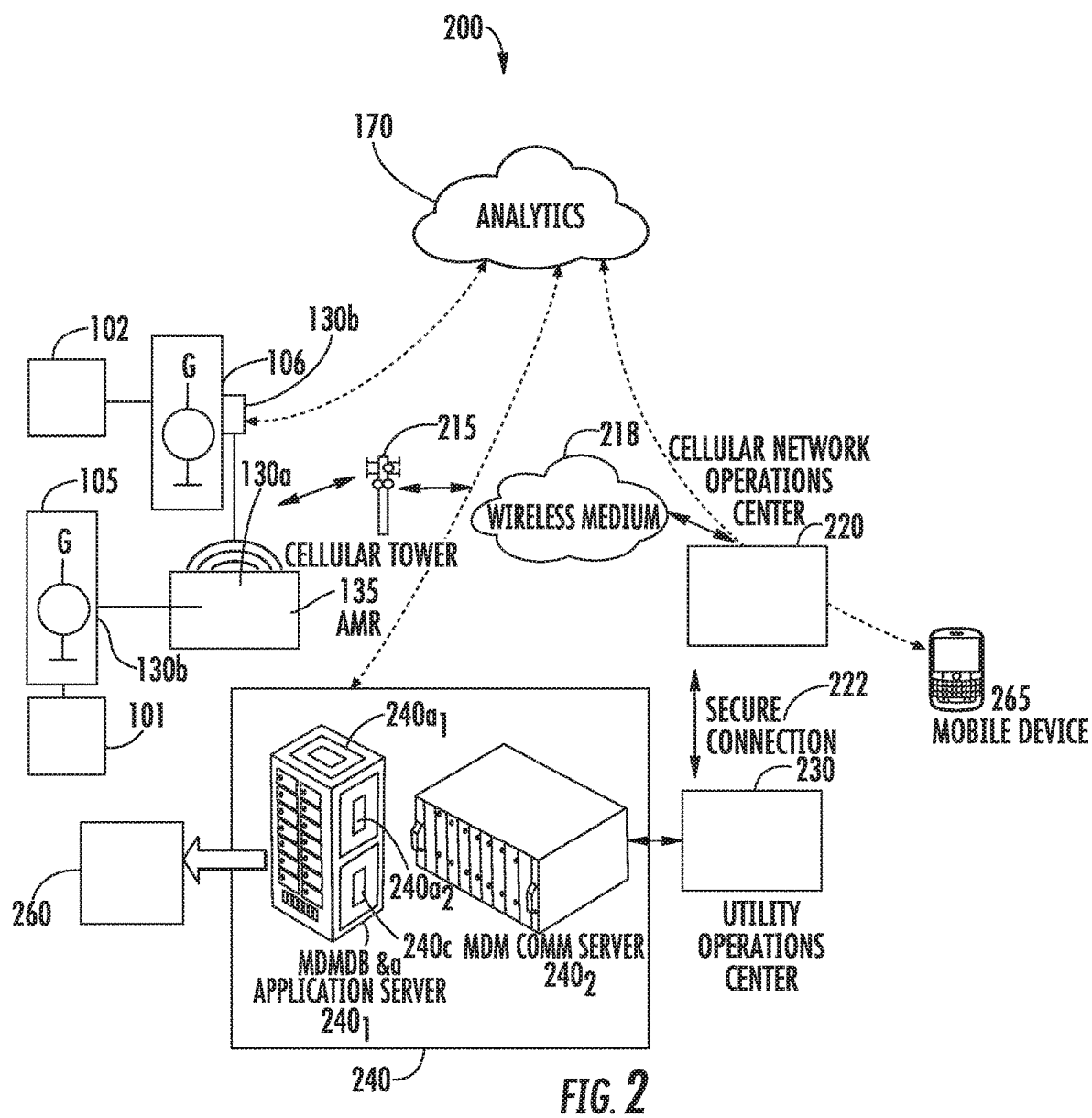
FIG. 2 is an example wireless smart gas metering and telemetry system schematic which includes an example split EVC, according to an example embodiment.

The gas meters are 105, 106, 107 are shown including an outer gas meter body 138 where a sensor interface unit 130$b$ is also shown physically embedded in the gas meter body 138. The dashed line shown between the respective gas meters 105, 106, 107 and its associated EVC sensor interface unit 130$b$ is shown to indicate the gas meters are 105, 106, 107 and EVC sensor interface units 130$b$ can also have separate bodies, such as shown in FIG. 2 described below.

The sensor interface units 130$b$ receive a gas pressure (P) from a P sensor 112 (e.g., pressure sensor-transducer) and gas temperature (T) from a T sensor 111 (e.g., temperature sensor-transducer) on or in the pipe section so that they are exposed to the flowing gas. As known in the art, the outputs of the P and T sensors 111, 112 can each be calibrated by appropriate circuits to produce respective output signals which are linearly and proportionately responsive to the absolute values of the measured temperature and pressure. In some cases one can use relative P referred to as gauge pressure sensors which measure differential P between the atmospheric pressure and gas P. Another sensor type that can be included is a gas chromatograph which can provide the details of the gas composition (e.g., for natural gas applications) to the sensor interface units 130$b$.

The sensor interface units 130$b$ can be directly installed in hazardous location as the companion module meaning the sensor interface units 130$b$ can be an add-on to gas meters 105-107 from any gas meter source or vendor. The sensor interface units 130$b$ alone can be battery powered (EVC processing unit 130$a$ being mains powered) which will help to offer higher battery life compared to a known EVC battery powering both the sensor unit and a processing unit. The sensor interface units 130$b$ can also be mains powered. The sensor interface units 130$b$ can be packaged in miniature form factor which helps to reduce its cost as well as ease of handling in field. The sensor interface unit 130$b$ alone can be packaged in a miniature size as compared to current EVC packaging where the combination of the EVC processing unit 130$a$, HMI, sensor interface unit 130$b$ and battery makes it larger in size.

As described above, the sensor interface units 130$b$ can be embedded into the body of the gas meter 105-107 directly, with options for performing energy harvesting directly from the pipe (power can be from the gas flow, differential pressure or from solar). This ensures close to a passive solution for EVC sensing and the field maintenance can also be simplified.

The EVC processing unit 130$a$ is shown including a memory 130$a_2$. The EVC processing unit 130$a$ as described above performs volume correction for generating CGVD from the UGVD received from each of the plurality of EVC sensor interface units 130$b$, data logging, as well as networking functions. Each EVC processing unit 130$a$ being connected to a plurality of EVC sensor units 130$b$ thus performs volume correction for multiple gas meters generally installed on multiple pipelines (respective pipelines are each associated with pipe sections 105$a$, 106$a$, 107$a$ shown in FIG. 1) which are independent of one another. The EVC processing unit 130$a$ is installed in a safe zone communicably coupled as shown in FIG. 1 to the sensor interface units 130$b$ by a short range wireless link 145 (Bluetooth or Bluetooth low energy (BLE), Wifi, Zigbee, ISA100 enabled wireless link). However, as noted above a wired connection can also be used. The EVC processing unit 130$a$ can be a generic embedded device which can handle communications to the plurality of sensor interface unit 130$b$ on one side and on the other side an uplink towards other systems such as a server and/or cloud-based systems. EVC processing unit 130$a$ can perform EVC calculations, controls (if needed), and communication functions. Specialized hardware is not needed. The EVC processing unit 130$a$ can include a display (e.g. LCD display) and other user interfaces.

As noted above the EVC processing unit 130$a$ can be mains powered, and can be provided with ample processing power (e.g., processor 130$a$1 comprising a microprocessor), memory 130$a_2$ and network connectivity. As noted above, the EVC processing unit 130$a$ performs volume correction for T and P to generate CGVD from the UGVD from a plurality of EVC sensor interface units 130b, data logging (i.e., can create log measurement and event information and store it for long term; this is a requirement for some of the certifications) and networking functions. For example EVC processing unit 130a can be connected to higher level systems or peer systems and exchange measurement, controls, and status information. Also, the EVC processing unit 130a can participate in functions including firmware and application upgrades at run time.

An Automatic Meter Reading (AMR) unit 135 is shown coupled to EVC processing unit 130a. Although the AMR unit 135 is shown as an outside unit, the EVC processing unit 130a and AMR unit 135 can be provided as a single physical unit as well. AMR technology allows for consistent and accurate collection of information from a gas meter. Collected data is transferred by the AMR unit 135 to a centralized database shown as cloud-based analytics 170 for billing purposes and/or usage analysis including big data applications where the data from several EVC processing units 130a are pulled in to a central location and analytics run on this data and generate meaningful information such as trend and usage information. The data can be used to optimize operations and for supply chain calculations. Analytics 170 can be a web-based application as well.

The communicable connection between the EVC sensor interface unit 130b and the EVC processing unit 130a can also be a wired connection, as an alternative to a wireless connection. For example, to address possible challenges in obtaining Measuring Instruments (MID) directive— IEC12405 certifications for a split EVC with a EVC sensor interface unit 130b and EVC processing unit 130a that are physically separated from one another there are at least 2 options. MID was adopted by the European Parliament and Council on 31 Mar. 2004, for application by EU Member States from 30 Oct. 2006. MID seeks to harmonize many aspects of legal metrology across all member states of the EU, including water meters and gas meters. There are also there are several geographical variants of this standard and one of the most important one is Measurement Canada (MC). Disclosed embodiments are not limited those satisfying MID.

Option 1. The sensor interface unit 130b can collect pressure and temperature data from the sensors 111, 112 and pulse information from the flow meters 105-107 and send this information to the EVC processing unit 130a through short range wired or wireless interface. Optionally, the sensor interface units 130b can perform some of the sensor data corrections, filtering, and compensations to ensure a large chunk of raw sensor data is not transferred to EVC processing unit 130a.

Option 2. The sensor interface units 130b can collect P, T and pulse information and perform MID calculation in local and send this to the EVC processing unit 130a in the safe zone through short range wireless or wired communications. This arrangement would be analogous to MID type 1 where the whole unit is certified for MID. In this case the additional processing unit (EVC processing unit 130a does not need to perform gas calculations, corrected and uncorrected information can come from sensor unit itself) would simply act like a gateway which would still add value but will have less impact in terms of product cost reduction. Doing all gas calculations and the calculations in the sensor interface units 130b makes it bulky but still additional functions such as communication, HMI etc. can be part of EVC processing unit 130a so that the split EVC is viable and cost competitive even in this form.

FIG. 2 is an example schematic for a wireless metering telemetry MDM system 200 which can include at least one disclosed split EVC 130a, 130b, according to an example embodiment. MDM server 240 is shown including a MDM database and application server $240_1$ having a processor 240c with an associated first memory $240a_1$ of the MDM database and application server $240_1$, and a separate MDM communications server $240_2$. The MDM database in the second memory $240a_2$ in application server $240_1$ is where the gas meter data generally resides and includes uncorrected GVD, CGVD, and the state variables of temperature and pressure for particular intervals of time which collectively provides a historical database which can be stored and processed for use for billing and other applications. Although the first memory $240a_1$ and second memory $240a_2$ are shown in FIG. 2 as separate memories, they can be provided by a single memory. The MDM database and application server $240_1$ is shown in FIG. 2 coupled to a billing, operations and other enterprise applications system 260.

In this non-limiting example gas meter data from gas meters shown as gas meter 105 associated with service location 101 and gas meter 106 associated with service location 102 reaches the MDM communications server $240_2$ of MDM server 240 over a communications path including a wireless communications network. Various sub-systems of the MDM system 200 are described based on this non-limiting example.

Gas meters 105 and 106 are shown communicably coupled split EVC (130a, 130b) for downloading consumption and gas meter readings generally including uncorrected GVD, and the state variables received from sensors (not shown), the split EVC is generally at each service location, where that can receive meter data from a plurality of gas meters each having unique remote unit identifier (RUID). Gas consumption related information generally comes in the form of pulses or as a rotary shaft coupling, in the form of current or in the form of voltage or in the form of data in hard real time mode to the sensor interface unit 130b. Sensor interface units 130b can perform a sensor data aggregator function and provide this information to EVC processing unit 130a at a comparatively lower rate/long time interval.

Split EVC 130a, 130b performs temperature and pressure correction to generate CGVD from the UGVD and state variable data (typically temperature and pressure) received. The gas volume at standard conditions is generally measured in standard cubic feet per minute (scfm) and is referred to as CGVD for a fixed duration of time (e.g., 15 minutes).

Regarding the communication link used in system 200, the communications network shown in FIG. 2 following split EVC 130a, 130b comprises cellular tower 215 over a wireless medium 218 shown by example to a cellular operations center 220, then through a secure connection 222 to a utility operations center 230 which can include the MDM server 240 shown in FIG. 2. As noted above, although shown as being a wireless network connecting split EVC (130a, 130b) to utility operation center 230, the split EVC (130a, 130b) depending on the type and configuration may also have the capability to transmit gas meter data over a telephone network or Internet protocol (IP) network to utility operation center 230. There are thus multiple possible modes of communication (including mixed modes) which can be used for transferring data from gas meters 105 and 106 to the MDM server 240. Each of these communication modes offers different bandwidth, reliability and cost of communication. Cloud-based analytics 170 is also shown coupled (e.g., by an IP connection) to the EVC processing unit 130a, mobile device 265 (e.g., a mobile phone) and the MDM server 240.

System 200 can also include a direct interface of the EVC processing unit 130a to the mobile device 265. With the help of a suitable mobile application a customer is able to establish either a direct data connection with EVC processing unit 130a or through the MDM server 240 and obtain all gas related information and diagnostics and status information of EVC processing unit 130a and sensor interface unit 130b on this mobile device 265 (or other mobile platform).

Regarding the data transfer mechanism, gas meter data (temperature, pressure, UGVD and CGVD) from the split EVC 130a, 130b is generally transferred to the MDM communications server $240_2$ based on a schedule defined by a call scheduler application that typically resides in MDM server 240. As in FIG. 1, in FIG. 2 the EVC processing unit 130a is shown including an AMR 135 coupled thereto for fetching all relevant data from the EVC processing unit 130a and consuming it or transferring it to the network through the cellular tower 215 shown in FIG. 2.

Generally, the interval data (both UGVD and CGVD), pressure, temperature, monthly data and additional information including device level diagnostics (e.g., alarm information) regarding the devices the MDM system involved transferring the gas meter data to the MDM server, as configured by the user in MDM application, which generally gets transferred once/twice or more frequently in each day. The duration of a 24 hr period is defined as "gas day" and the start and end times set (e.g., 8 am to 8 am next day) as per user' configuration. Similar is the case with monthly data also, if monthly gas data is accumulated and available at the split EVC 130a, 130b, it can be read once in a month as per the billing calendar configurable by the user of MDM application.

EVC processing unit 130a can allow dynamic configuration of sensor interface unit 130b and can enable some limited control functions. For example if EVC processing unit 130a receives information from a customer that one of the gas pipes will not be in use for few days the respective sensor interface unit can be brought down to power down to save battery power. Data can be shared between the EVC processing unit 130a and the sensor interface unit 130b, for example for a cluster of sensor interface units 130b installed in a site one generally only needs one sensor attached to one of the 130b for sensing ambient temperature, where this information can be shared across all sensor interface units 130b's through EVC processing unit 130a.

In case the EVC processing unit 130a goes down for some time, the sensor interface units 130b's can retain gas information in their memory $130b_2$ which can be made available to the EVC processing unit 130a once it comes back on-line. The EVC processing unit 130a can be provided with functional redundancy to reduce down time. The EVC processing unit 130a can be part of other subsystems such as AMR 135. Data from the EVC processing unit 130a or AMR 135 can be brought to cloud shown as analytics 170, MDM 240 or to a mobile device 265 directly.

Disclosed embodiments can be applied to generally accurately measure any fluid flow. For example, for natural gas or propane sales.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. An Electronic Volume Corrector (EVC) for measuring a flow of a gas in a gas line, comprising:
a plurality of EVC sensor interface units for collecting a plurality of sensed sensor parameters including uncorrected gas volume data (UGVD) from a gas meter, a gas pressure from a gas pressure sensor and gas temperature from a gas temperature sensor;
an EVC processing unit directly communicably connected to said plurality of EVC sensor interface units for performing volume corrections for generating corrected GVD (CGVD) from said UGVD received from each of said plurality of EVC sensor interface units, data logging, and networking functions;
a meter data management (MDM) server communicably coupled to receive said CGVD from said EVC processing unit that provides a historical database of data regarding said gas meter including said gas temperature, said gas pressure, and said CGVD, for applications including billing; and
wherein said EVC sensor interface units and said EVC processing unit are configured independent including being physically separate from one another.

2. The EVC of claim 1, wherein said EVC processing unit independently processes said volume corrections corresponding to each of said plurality of said EVC sensor interface units.

3. The EVC of claim 1, wherein said directly communicably connected comprises a wireless connection.

4. The EVC of claim 1, further comprising a gas meter body, wherein said EVC sensor interface unit is physically embedded in said gas meter body.

5. The EVC of claim 1, wherein said EVC sensor interface unit is exclusive of an external power source, and is powered using at least one of a battery, harvested power from physical properties of said flow of said gas, wind or solar energy.

6. The EVC of claim 1, wherein said EVC processing unit provides data processing to extract statistical information related metering information.

7. A method of volume correction for a gas flow in a gas line, comprising:
providing an Electronic Volume Corrector (EVC) comprising a plurality of EVC sensor interface units and an EVC processing unit that are configured independent including being physically separate from one another;
said plurality of EVC sensor interface units collecting a plurality of sensed sensor parameters including uncorrected gas volume data (UGVD) from a gas meter, and a gas pressure from a gas pressure sensor and gas temperature from a gas temperature sensor;

wherein said EVC processing unit is directly communicably connected to said plurality of EVC sensor interface units for performing volume corrections for generating corrected GVD (CGVD) from said UGVD received from each of said plurality of EVC sensor interface units, data logging and networking functions; and wherein a meter data management (MDM) server is communicably coupled to receive said CGVD from said EVC processing unit that provides a historical database of data regarding said gas meter including said gas temperature, said gas pressure, and said CGVD, for applications including billing.

8. The method of claim 7, wherein said EVC processing unit independently processes said volume corrections corresponding to each of said plurality of said EVC sensor interface units.

9. The method of claim 7, wherein said EVC processing unit is in a safe zone and said EVC sensor interface units are in a hazardous zone.

10. The method of claim 7, wherein said directly communicably connected comprises a wireless connection.

11. The method of claim 7, wherein said EVC sensor interface units are exclusive of an external power source, and is powered using at least one of a battery of harvested power from physical properties of said gas flow, wind or solar energy.

12. The method of claim 7, wherein said EVC processing unit and said plurality of EVC sensor interface units are both installed at a common site, further comprising sharing data between said plurality of EVC sensor interface units and said EVC processing unit.

13. The method of claim 7, wherein said plurality of EVC sensor interface units include a memory for retaining information regarding said gas, further comprising following recovery from said EVC processing unit from being down from service, said EVC sensor interface unit providing information regarding said gas to said EVC processing unit.

* * * * *